United States Patent
Huang et al.

(10) Patent No.: US 6,462,314 B1
(45) Date of Patent: Oct. 8, 2002

(54) CONTROL SYSTEM FOR A HUMIDIFIER

(76) Inventors: Chen-Lung Huang, 9F3R, No. 210, Chung Hsueh Rd., Tainan City (TW); Chuang-pan Huang, 9F3R, No. 210, Chung Hsueh Rd., Tainan City (TW)

( * ) Notice: Subject to any disclaimer, the term of this patent is extended or adjusted under 35 U.S.C. 154(b) by 0 days.

(21) Appl. No.: 09/704,343

(22) Filed: Oct. 30, 2000

(51) Int. Cl.[7] .......................... H05B 1/02; F02M 31/12
(52) U.S. Cl. ...................................... 219/501; 261/142
(58) Field of Search .................. 219/497, 501, 219/504, 507; 261/DIG. 48, DIG. 65, 139, 142; 338/172, 173, 162, 163

(56) References Cited

U.S. PATENT DOCUMENTS

| | | | |
|---|---|---|---|
| 3,989,042 A | * 11/1976 | Mitsui et al. | 261/DIG. 48 |
| 4,479,106 A | * 10/1984 | Shimizu et al. | 338/174 |
| 4,563,313 A | * 1/1986 | Tsuaki | 261/81 |
| 4,643,351 A | * 2/1987 | Fukamachi et al. | 261/DIG. 48 |
| 4,820,453 A | * 4/1989 | Huang | 261/26 |
| 5,939,973 A | * 8/1999 | Imamura | 338/172 |

* cited by examiner

Primary Examiner—Sang Paik

(57) ABSTRACT

A control system for a humidifier includes a variable resistor with an on/off switch function and a DC fan for dispersing heat in order to lower the cost of a humidifier. The control system includes an AC input terminal, a transformer to lower AC, a bridge rectifier to rectifying AC into DC supplied to the control system circuit. Further, an adjusting terminal of the variable resistor is connected between two resistors, and another terminal thereof is connected respectively to a power lamp and a heat dispersing fan and an ultrasonic oscillator. Thus, provision of the variable resistor with an on/off switch function for turning on and off the ultrasonic oscillator can lower the cost of a humidifier.

1 Claim, 4 Drawing Sheets

CONTROL SYSTEM FOR A HUMIDIFIER

BACKGROUND OF THE INVENTION

This invention relates to a control system for a humidifier, particularly to one having a variable resistor with an on/off switch function for turning on and off a supersonic oscillator so as to lower the cost of a humidifier.

A known conventional control system for a humidifier shown in FIGS. 1 and 2, includes an AC input terminal, an interactive switch SW consisting of a variable resistor VR and a silver contact point, a neon lamp L and an AC fan F for heat dispersing connected in parallel to the interactive switch SW, a transformer T for lowering the voltage, a bridge rectifier B1 for changing AC into DC, two resistors R1, R2 connected in parallel to the input and the output 1 and 2 of the bridge rectifier B1, a contact point 3 between the two resistors R1, R2 connected to one end of the variable resistor VR, two inductance coils L1, L2 and the base of a transistor Q1 connected in series to the variable resistor VR. Further, an ultrasonic oscillator circuit provided between the inductance coil L1 and L2 and consisting of a capacitor C1 and an ultrasonic oscillator H., and a capacitor C2 connected between the capacitor C1 and the ultrasonic oscillator H to divide current. Then the emitter 5 of the transistor Q1 is connected to another inductance coil L3, and a diode D1 is connected between the emitter 5 and the inductance coil L3 to divide the current, and a capacitor C3 is connected to the end of the circuit of the control system.

The known conventional control system for a humidifier consists the switch SW and the silver contact point to function as a general switch for the control system for a humidifier. So the conventional control system for a humidifier has a disadvantage of high cost.

SUMMARY OF THE INVENTION

The objective of the invention is to offer a control system for a humidifier of a lower cost than that of the conventional ones.

One feature of the invention is a variable resistor used in the control system also having on/off function, enabling the control system more quickly operated.

Another feature of the invention is a DC fan used instead of an AC fan for dispersing heat to lower the cost of the control system.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
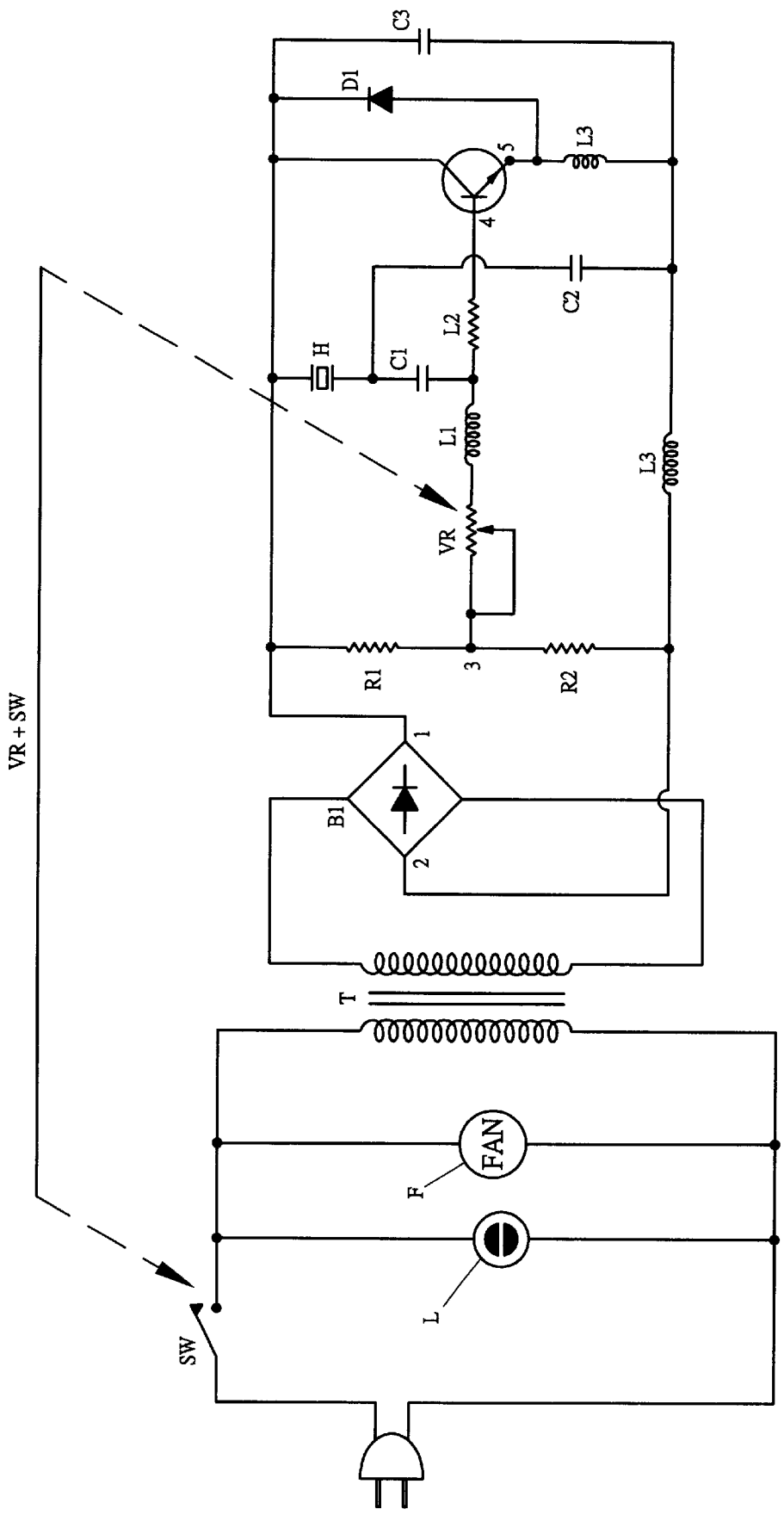
FIG. 1 is a diagram of a known conventional control system for a humidifier.
Figure 2:
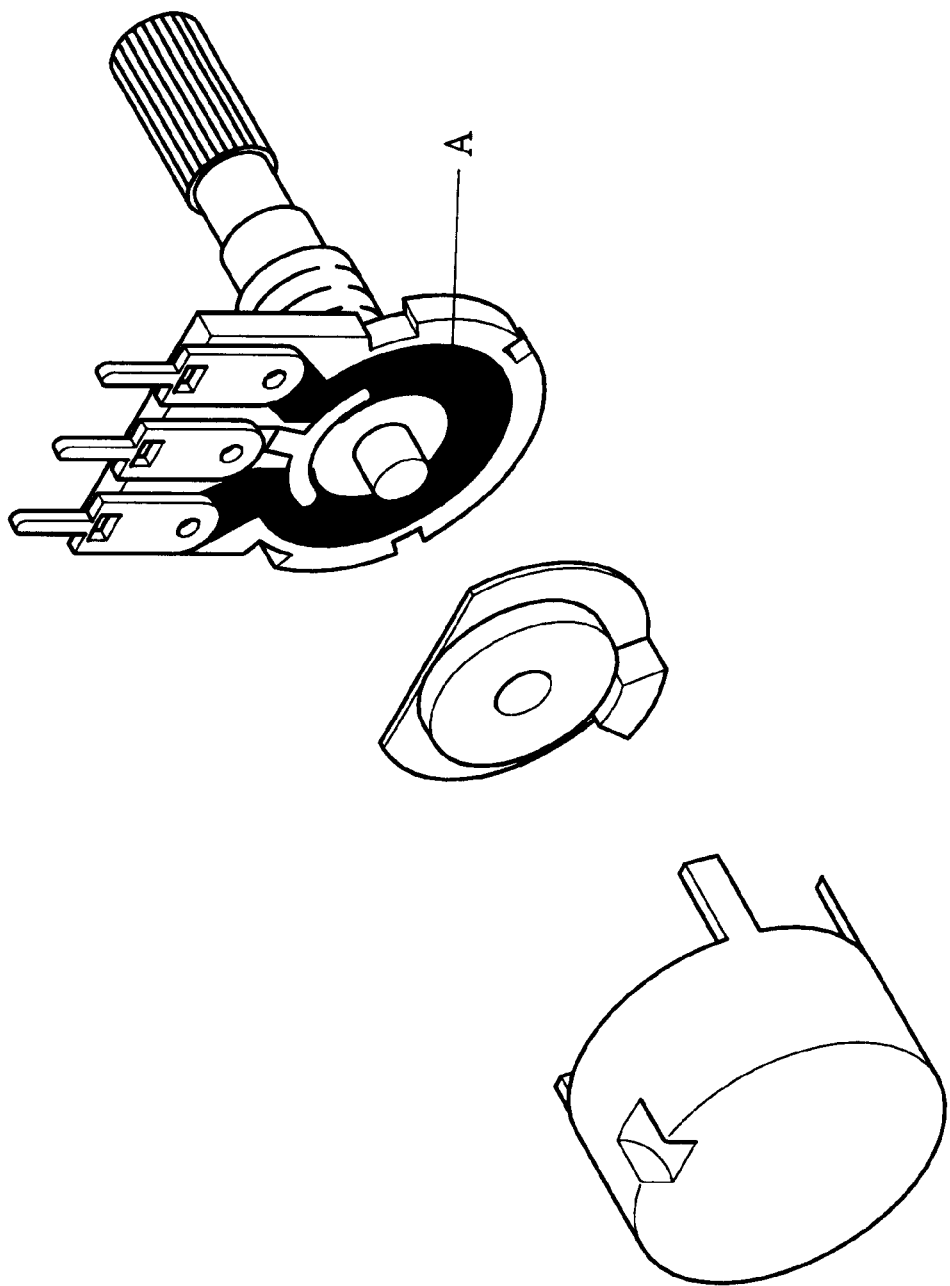
FIG. 2 is a perspective view of a variable resistor in the known conventional control system for a humidifier.
Figure 3:
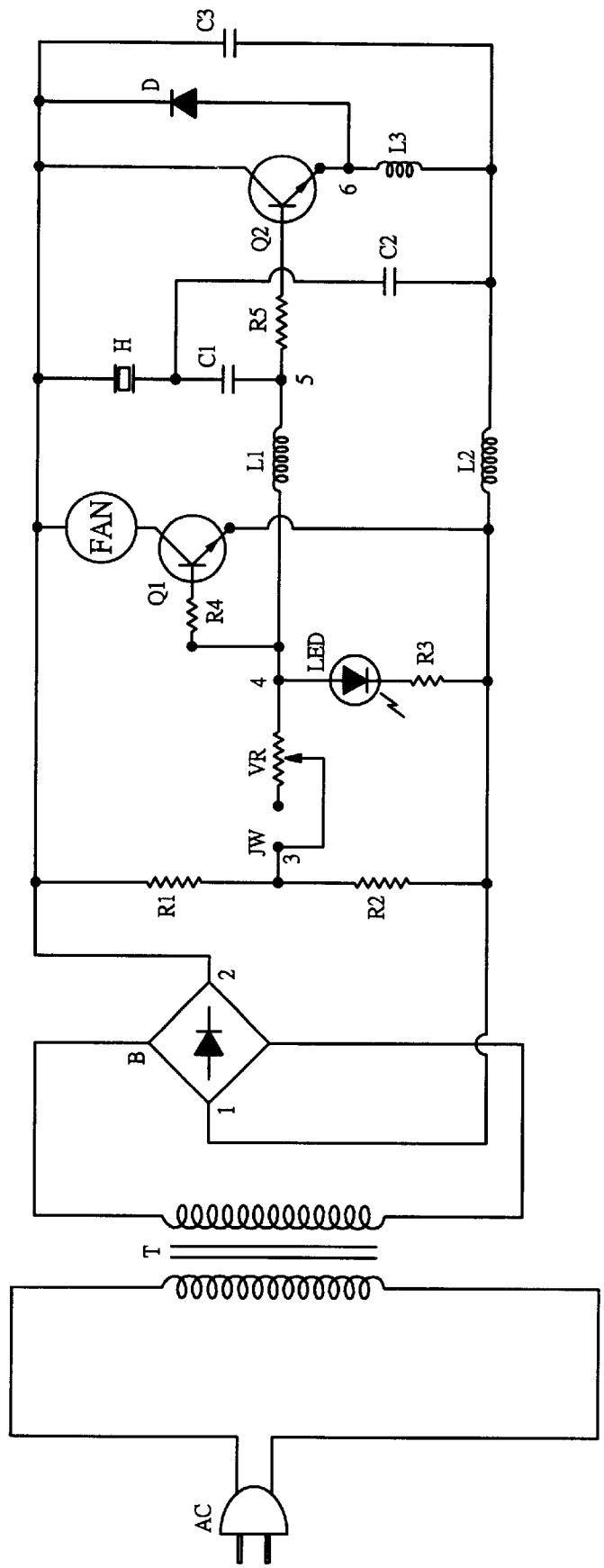
FIG. 3 is a diagram of a control system for a humidifier in the present invention; and, FIG. 4 is a perspective view of a variable resistor in the control system for a humidifier in the present invention.
Figure 4:
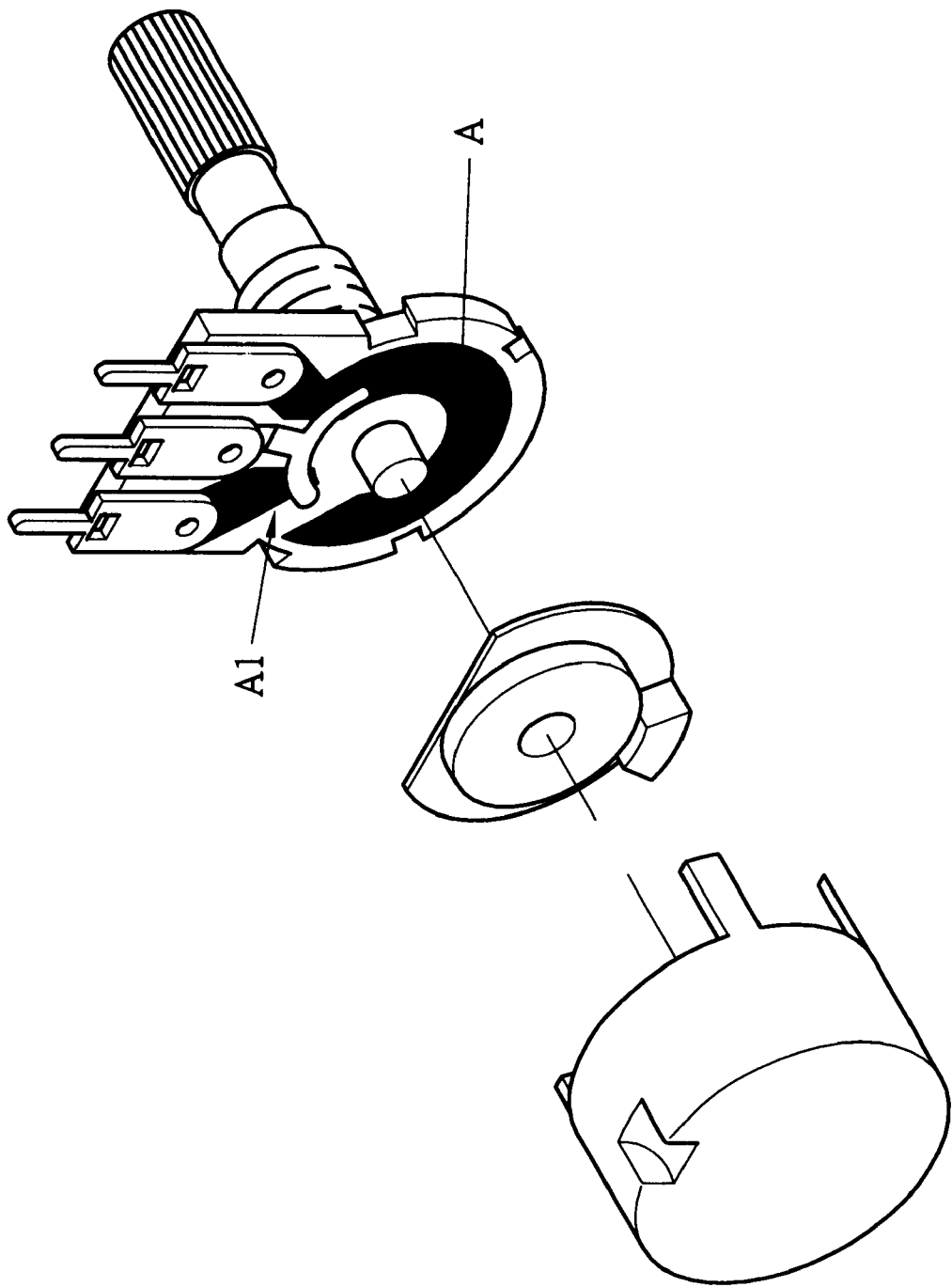

A preferred embodiment of a control system for a humidifier in the present invention, as shown in FIG. 3, includes an AC input terminal AC, a transformer T for lowering AC voltage, a bridge rectifier B connected to the transformer T to change AC into stabilized DC, first and second resistors R1 and R2 connected in parallel to first and second terminals 1 and 2 of the bridge rectifier B, a variable resistor VR having third terminal 3 connected between the first and second resistors R1, R2 to permit a carbon ring A shortened in advance to form a blank A1 to let the variable resistor VR function as an on/off switch SW. Then a power lamp LED, a third resistor R3 and a first transistor Q1 for current dividing are connected to fourth terminal 4 of the variable resistor VR. The emitter of the first transistor Q1 is connected to one end of an second inductance coil L2, and the collector of the first transistor Q1 is connected to one terminal of a DC fan. Further, the fourth terminal 4 is also connected to a current dividing circuit formed of an first inductance coil L1, a fifth resistor 5, and a second transistor Q2. A fifth terminal 5 between the first inductance coil L1 and the fifth resistor R5 is connected to a current diving circuit formed of a capacitor 1 and a supersonic oscillator H. Then a current dividing circuit formed between the supersonic oscillator H and the first capacitor C1 is connected to a second capacitor 2. Then the fifth resistor 5 is connected to the base of the second transistor Q2, and the sixth terminal 6 of emitter of second transistor Q2 is connected to an third inductance coil L3 and also connected to a diode D. Then a second capacitor 2 is connected to the end of the circuit.

When the variable resistance VR is adjusted to have a resistance value and also turns on the power, the power lamp LED is lit up, with the first and second transistors Q1 and Q2 turned on to start the supersonic oscillator H. When the variable resistor VR is adjusted to the blank space A1 of the carbon ring A and turns off the power, the power lamp LED is turned off, with the supersonic oscillator H also turned off. Thus the variable resistor VR has function as an on/off switch. In addition, the DC fan can reduce some cost of a humidifier as well.

While the preferred embodiment of the invention has been described above, it will be recognize and understood that various modifications may be made therein and the appended claims are intended to cover all such modifications that may fall within the spirit and scope of the invention.

What is claimed is:

1. A control system for a humidifier comprising an AC terminal, a transformer for lowering AC current, a bridge rectifier rectifying AC into DC, first and second resistors connected in parallel to first and second terminals of said bridge rectifier, a current dividing circuit formed between said fist resistor and said second resistor and connected to third terminal of a variable resistor, fourth terminal of said variable resistor connected to another current dividing circuit including a power lamp LED and a third resistor connected between said power lamp LED and the emitter of a first transistor, said fourth terminal also connected to a forth resistor and then to the base of said first transistor, said first transistor having its collector connected to a DC fan, an first inductance coil connected to the emitter of said first transistor and then to a fifth resistor connected to the base of a second transistor, a fifth terminal between said first inductance coil and said fifth resistor connected to another current dividing circuit including a first capacitor and a ultrasonic oscillator, said fifth resistor connected to the base of said second transistor, the sixth terminal of the emitter of said second transistor connected to a third inductance coil and also to a diode, an third inductance connected parallel to the end of said circuit, said power lamp lit up when said variable resistor is rotated to turn on the circuit of said control system, said ultrasonic oscillator at the same time turning on said humidifier, the circuit of said control system turned off and said ultrasonic oscillator also turning off said humidifier if said variable resistor is turned to a blank space of a carbon ring.

* * * * *